Patented Nov. 10, 1953

2,658,894

UNITED STATES PATENT OFFICE 2,658,894

FORMOGUANAMINES AND THEIR PREPARATION

Donald W. Kaiser, Old Greenwich, and John J. Roemer, Stamford, Conn., assignors to American Cyanamid Company, New York, N. Y., a corporation of Maine No Drawing. Application September 16, 1950, Serial No. 185,340

4 Claims. (Cl. 260—249.9)

The present invention relates to formoguanamines and their preparation.

It is an object of the invention to prepare formoguanamines by reacting a 1-halo-2,4-diamino-s-triazine with hydriodic acid. Additional objects will be apparent from the discussion hereinafter.

In general the invention contemplates heating a 1-halo-2,4-diamino-s-triazine, such as 1-iodo-2,4-diamino-s-triazine or the like with hydriodic acid at a temperature of about 70°–120° C. for a length of time necessary to give a fair yield of formoguanamine, and thereafter separating the thus-formed formoguanamine from the reaction mass. The mole ratio of hydriodic acid to halodiamino-s-triazine must be at least 1:1, and preferably is about 5:1. The temperature is preferably 90°–120° C.

The reaction also proceeds with the substituted halodiaminotriazines to give the corresponding substituted formoguanamine, according to the reaction:

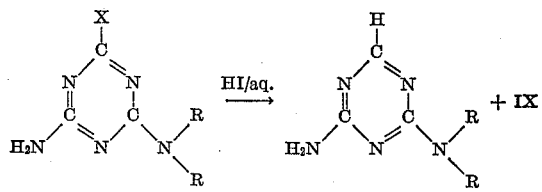

in which X is halogen and R is hydrogen, aliphatic, cycloaliphatic, or aralkyl radical. The R's may be the same or different. Among suitable radicals are methyl, ethyl, propyl, isopropyl, butyl, isobutyl, amyl, hexyl, dodecyl, 2-ethylhexyl, cyclohexyl, benzyl, xylyl, phenylethyl, phenylpropyl, mesitylyl, cumyl, and the like.

The substituted halodiaminotriazines can be conveniently prepared by the process set forth in U. S. application S. N. 185,338, filed September 16, 1950, e. g., by reacting the corresponding substituted dicyanoguanidine with a halogen acid at 0°–40° C.

Example 1

About 0.01 mole of iododiaminotriazine was boiled for a few minutes with about 0.05 mole of hydriodic acid (47.3%). Complete solution occurred with development of a deep red color characteristic of free iodine. The reaction mixture was cooled, made alkaline with sodium hydroxide to free the formoguanamine from its hydrohalide salt. The alkaline solution was then decolorized with sodium bisulfite. On standing, small white crystals of formoguanamine separated which on recrystallization from water melted at 315° C.

Example 2

Chlorodiaminotriazine_____ 1.46 g. (0.01 mole)
Hydriodic acid 47.3%_____ 13.5 g. (0.05 mole)

The above were heated to boiling for 3–5 minutes, diluted with 25 cc. water; made alkaline and decolorized as in Example 1. On cooling and filtering 0.3 g. (27% yield) of white crystalline formoguanamine of M. P. 313°–315° C. was obtained.

Example 3

2 - amino - 4 - benzylamino - 6 - chloro - 1,3,5-triazine _____ 5 g.
Hydriodic acid 47.3% _____ 35 cc.

The triazine was added to the boiling acid. In 10 minutes the solution became clear. It was then cooled; made alkaline and filtered. One gram of a new compound, 4-N-benzyl formoguanamine M. P. 170–175° C. (from isopropanol) was obtained.

The compounds made by the process of this invention are useful in the preparation of dyes, pharmaceuticals, resins, and the like.

While the invention has been described with particular reference to specific embodiments, it is to be understood that it is not to be limited thereto but is to be construed broadly and restricted solely by the scope of the appended claims.

We claim:

1. The method of preparing a formoguanamine that comprises heating a mixture consisting of a halo-diamino-s-triazine and hydriodic acid at a temperature in the range 70°–120° C., the mole ratio of acid:triazine reactant being at least 1:1.

2. The method according to claim 1 in which the triazine reactant is iodo-diamino-s-triazine.

3. The method according to claim 1 in which the triazine reactant is chloro-diamino-s-triazine.

4. The method according to claim 1 in which the triazine reactant is 2-amino-4-benzylamino- 6-chloro-s-triazine and the product is 4-N-benzyl formoguanamine.

DONALD W. KAISER.
JOHN J. ROEMER.

References Cited in the file of this patent

UNITED STATES PATENTS

| Number | Name | Date |
|---|---|---|
| 2,387,547 | Widmer | Oct. 23, 1945 |

FOREIGN PATENTS

| Number | Country | Date |
|---|---|---|
| 252,530 | Switzerland | 1948 |
| 261,811 | Switzerland | 1949 |
| 261,812 | Switzerland | 1949 |
| 261,813 | Switzerland | 1949 |
| 261,814 | Switzerland | 1949 |
| 261,815 | Switzerland | 1949 |
| 261,816 | Switzerland | 1949 |
| 261,817 | Switzerland | 1949 |
| 261,818 | Switzerland | 1949 |

OTHER REFERENCES

Diels, Ber. der deut. Chem. Ges., 1899, vol. 32, pp. 691–4, 1219 and 1220.